United States Patent
Masuo

(10) Patent No.: US 9,802,261 B2
(45) Date of Patent: Oct. 31, 2017

(54) MAIN SPINDLE MECHANISM

(71) Applicant: MITSUBISHI HEAVY INDUSTRIES MACHINE TOOL CO., LTD., Ritto-shi, Shiga (JP)

(72) Inventor: Koichi Masuo, Tokyo (JP)

(73) Assignee: MITSUBISHI HEAVY INDUSTRIES MACHINE TOOL CO., LTD., Shiga (JP)

(*) Notice: Subject to any disclaimer, the term of this patent is extended or adjusted under 35 U.S.C. 154(b) by 0 days.

(21) Appl. No.: 14/912,420

(22) PCT Filed: Sep. 3, 2014

(86) PCT No.: PCT/JP2014/073152
§ 371 (c)(1),
(2) Date: Feb. 17, 2016

(87) PCT Pub. No.: WO2015/064204
PCT Pub. Date: May 7, 2015

(65) Prior Publication Data
US 2016/0193677 A1    Jul. 7, 2016

(30) Foreign Application Priority Data
Oct. 28, 2013  (JP) ................................ 2013-223270

(51) Int. Cl.
*B23F 23/12*   (2006.01)
*B23C 5/26*    (2006.01)
(Continued)

(52) U.S. Cl.
CPC ............ *B23F 23/1243* (2013.01); *B23C 3/12* (2013.01); *B23C 5/26* (2013.01); *B23F 5/22* (2013.01);
(Continued)

(58) Field of Classification Search
CPC . Y10T 409/309632; Y10T 409/309408; Y10T 409/309352; Y10T 409/10159;
(Continued)

(56) References Cited

U.S. PATENT DOCUMENTS 1,053,295 A * 2/1913 Kearney et al. .......... B23C 9/00
                                                    409/228
1,364,925 A * 1/1921 Fischer .................... B23C 7/04
                                                    125/13.01
(Continued)

FOREIGN PATENT DOCUMENTS

CN    1429142 A    7/2003
CN    2871084 Y    2/2007
(Continued)

OTHER PUBLICATIONS

English Translation of the Written Opinion of the International Searching Authority of International Application No. PCT/JP2014/073152 dated Sep. 12, 2014.
(Continued)

*Primary Examiner* — Daniel Howell
*Assistant Examiner* — Yasir Diab
(74) *Attorney, Agent, or Firm* — Birch, Stewart, Kolasch & Birch, LLP

(57) ABSTRACT

Provided is a main spindle mechanism for a machine tool such that even in the case of a small-diameter spindle, it is possible to increase the torque transmitted to a large cutter and it is possible to prevent contact to and collisions with the workpiece. The main spindle mechanism, which is provided to a machine tool that cuts a workpiece by means of a cutter, is characterized by having: a spindle that transmits torque from the drive power source of the machine tool and is formed with outer teeth at the outer periphery of the tip thereof; a large cutter arbor provided with a shaft for
(Continued)

attaching the large cutter and a base at which outer teeth are formed having the same diameter as the outer teeth of the spindle; and a gear-coupling-shaped sleeve that is provided in a manner so as to cover the base of the large cutter arbor and the tip of the spindle, and at which are formed inner teeth that mesh with both the outer teeth of the spindle and the outer teeth of the large cutter arbor.

6 Claims, 10 Drawing Sheets

(51) Int. Cl.
  *B23F 5/22* (2006.01)
  *B23C 3/12* (2006.01)
  *F16D 1/10* (2006.01)
  *F16H 1/10* (2006.01)

(52) U.S. Cl.
  CPC ............... *F16D 1/101* (2013.01); *F16H 1/10* (2013.01); *F16D 2001/102* (2013.01); *Y10T 409/10159* (2015.01); *Y10T 409/309352* (2015.01); *Y10T 409/309408* (2015.01)

(58) Field of Classification Search
  CPC ............... B23F 23/1206; B23F 23/1237; B23F 23/1243; B23F 5/22; B23F 5/24; B23F 5/26; B23Q 3/12

See application file for complete search history.

(56) References Cited

U.S. PATENT DOCUMENTS

| | | | | |
|---|---|---|---|---|
| 2,248,468 | A * | 7/1941 | Severson | B23Q 1/70 407/56 |
| 3,155,006 | A * | 11/1964 | Schroeder | B23Q 1/70 384/513 |
| 4,776,734 | A | 10/1988 | Buettiker et al. | |
| 5,915,896 | A * | 6/1999 | Koczarski | B23B 31/201 279/133 |
| 6,568,883 | B1 * | 5/2003 | Fukui | B23B 29/046 408/1 R |
| 2010/0133761 | A1 * | 6/2010 | Waggle | B23B 31/11 279/143 |
| 2013/0001900 | A1 * | 1/2013 | Schuffenhauer | B23B 31/026 279/133 |

FOREIGN PATENT DOCUMENTS

| | | |
|---|---|---|
| CN | 201547142 U | 8/2010 |
| CN | 102615358 A | 8/2012 |
| JP | 62-203701 A | 9/1987 |
| JP | 5-57553 A | 3/1993 |
| JP | 60-85844 A | 3/1993 |
| JP | 2003-172668 A | 6/2003 |
| JP | 3118962 U | 2/2006 |
| JP | 2009-257393 A | 11/2009 |

OTHER PUBLICATIONS

Chinese Office Action and Search Report, dated Dec. 12, 2016, for Chinese Application No. 201480052541.7, together with an English translation thereof.

* cited by examiner

MAIN SPINDLE MECHANISM

TECHNICAL FIELD

The present invention relates to a main spindle mechanism which is provided a machine tool which cuts a workpiece by means of a cutter.

BACKGROUND ART

In the related art, in a machine tool, an end surface drive key is used so as to transmit driving power of a spindle to a tool.

In addition, PTL 1 discloses a gear coupling which is a gear type shaft coupling for transmitting torque. However, this gear coupling has not been applied to a machine tool.

CITATION LIST

Patent Literature

[PTL 1] Japanese Unexamined Patent Application Publication No. 2003-172668

SUMMARY OF INVENTION

Technical Problem

Here, with reference to FIGS. 10 and 11 problems of a main spindle mechanism of a machine tool of the related art are described. As shown in FIG. 10, in a main spindle mechanism 102 of a hobbing machine 101, when it is necessary to transmit a large torque by an end surface drive key 120, diameter D5 of a hob spindle 106 to which one of the end surface drive key 120 is attached and a diameter D6 of a large cutter arbor base 112a to which the other end of the end surface drive key 120 is attached are required to be large. If the diameter D5 of the hob spindle 106 is formed so as to be large, when a workpiece (an abject to be machined) W is cut, there is a problem that the workpiece W and the hub spindle 106 easily collide with each other.

In addition, as shown in FIG. 11, when there is replacement with a small cutter 116 so as to be used with respect to the same hob spindle 106, since the diameter D5 of the hob spindle 106 is formed so as to be large, there is a problem that the workpiece W to be cut by the small cutter 116 easily collides with or comes into contact with the hob spindle 106.

Moreover, in order to prevent the collision, it is necessary to increase an overhang amount (a distance from the hob spindle 106 to the cutter in a direction of a rotation axis A) of a cutter arbor, to which the small cutter 116 is attached, from the gear hobbling spindle 106. Accordingly, there is a problem that a size of the hobbling machine101 increases.

Therefore, the present invention is made so as to solve the above-described problems of the related art, and an object thereof is to provide a main spindle mechanism of a machine tool capable of increasing the torque transmitted to a large cutter even in a case of a small-diameter spindle, and preventing contact to or collision with a workpiece.

Solution to Problem

In order to achieve the object, there is provided a main spindle mechanism which is provided on a machine tool which cuts a workpiece by means of a cutter, including: a spindle which transmits torque from a drive power source of the machine tool and in which outer teeth are formed on an outer periphery of a tip of the spindle; a large cutter arbor which includes a shaft portion for attaching a large cutter and a base in which outer teeth having the same diameters as the outer teeth of the spindle are formed; and a gear-coupling-shaped sleeve which is provided so as to cover the tip of the spindle and the base of the large cutter arbor and in which inner teeth which mesh with both the outer teeth of the spindle and the outer teeth of the large cutter arbor are formed.

In the present invention configured as described above, since the gear-coupling-shaped sleeve is provided so as to cover the tip of the spindle and the base of the large cutter arbor, and the inner teeth which mesh with both the outer teeth of the spindle and the outer teeth of the large cutter arbor are formed, the torque of the spindle is transmitted to the shaft portion of the large cutter arbor, to which the large cutter is attached, via the outer teeth of the spindle, the inner teeth of the gear-coupling-shaped sleeve, and the outer teeth of the large cutter arbor. In this way, in the present invention, since the torque of the spindle is transmitted by meshing of the teeth, it is possible to use a large cutter, and unlike the related art, it is possible to decrease the diameter of the spindle. Moreover, since it is possible to decrease the diameter of the spindle, it is possible to prevent contact and collision between the workpiece and the spindle.

In the present invention, preferably, further, the main spindle mechanism further includes: a small cutter arbor which includes a shaft portion for attaching a small cutter and a base which has a smaller outer diameter than that of the base of the large cutter arbor; and an end surface drive key for connecting the base of the small cutter arbor and an end surface of the tip of the spindle, in which when the small cutter is used, the large cutter arbor is removed in a state where the gear-coupling-shaped sleeve is removed, and the small cutter arbor is connected to the spindle by the end drive key.

In the present invention configured as described above, when the workpiece is cut using the smaller cutter, in the state where the gear-coupling-shaped sleeve is removed, the smaller cutter arbor is connected to the spindle by the end surface drive key, the workpiece does not collide with the gear-coupling-shaped sleeve, and the outer diameter of the base of the small cutter arbor is smaller than the base of the large cutter arbor. Accordingly, it is possible to prevent the workpiece from colliding with the base of the small cutter arbor.

In the present invention, preferably, the machine tool is a hobbing machine

In the present invention, preferably, there is provided a machine tool including the main spindle mechanism.

Advantageous Effects of Invention

According to a main spindle mechanism of a machine tool of the present invention, it is possible to increase torque transmitted to a large cutter and it is possible to prevent contact to and collision with a workpiece.

DESCRIPTION OF EMBODIMENTS

Figure 1:
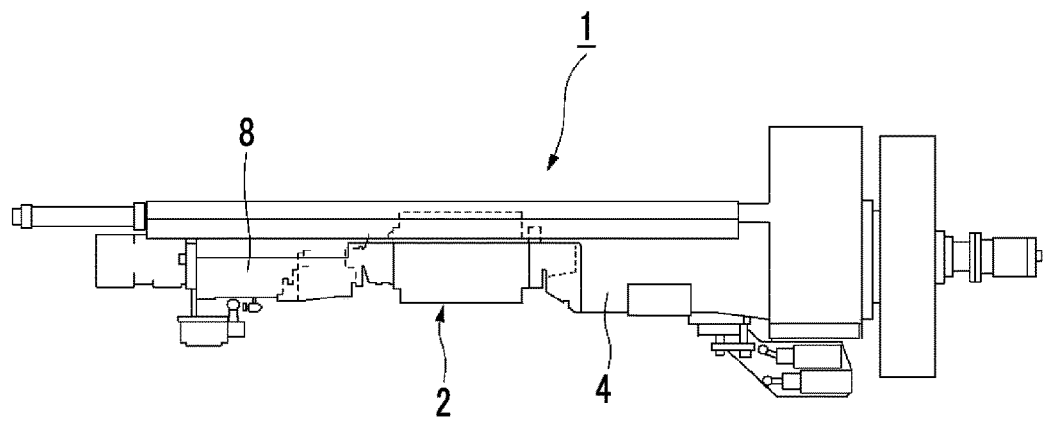
FIG. 1 is a schematic plan view showing a main spindle mechanism of a machine tool according to an embodiment of the present invention.
Figure 2:
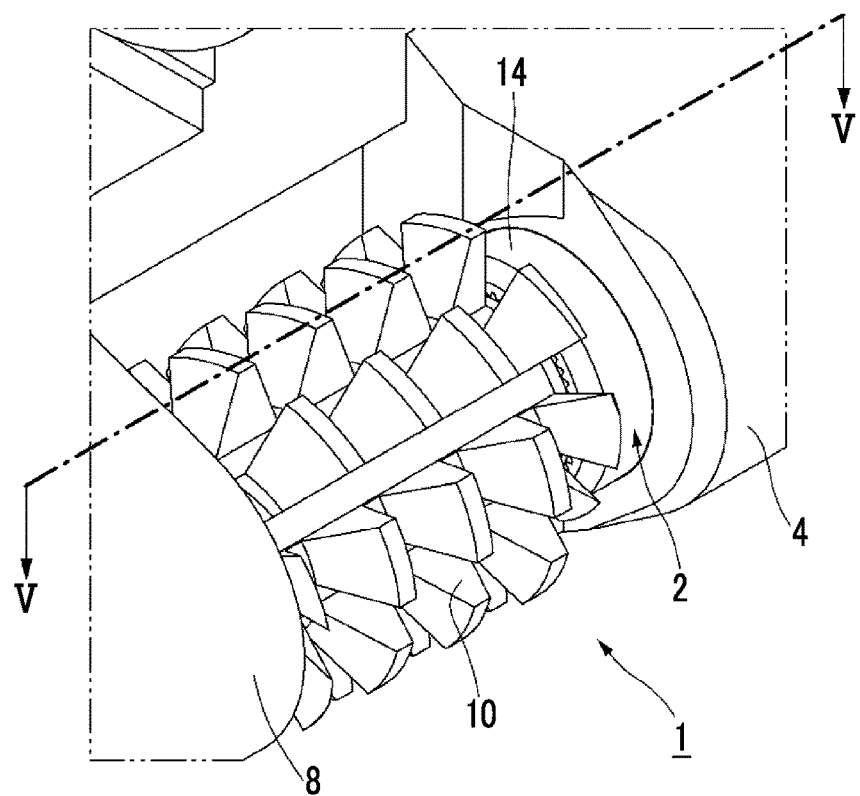
FIG. 2 is a perspective view showing the main spindle mechanism of the machine tool in a state where a large cutter according to the embodiment of the present invention is attached.
Figure 3:
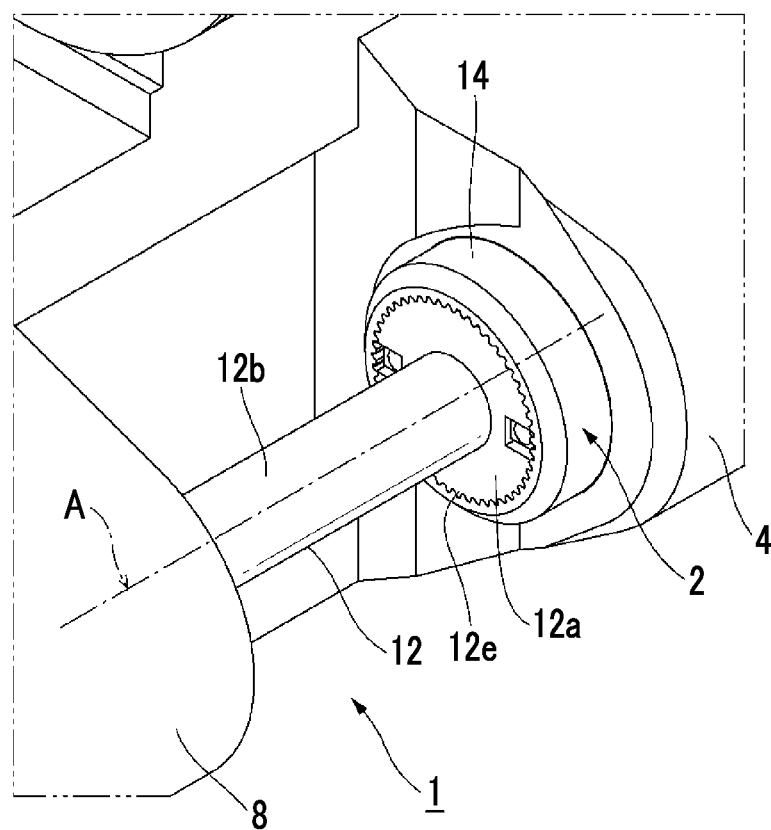
FIG. 3 is a perspective view showing a state where the large cutter is removed in the main spindle mechanism of the machine tool shown in FIG. 2.
Figure 4:
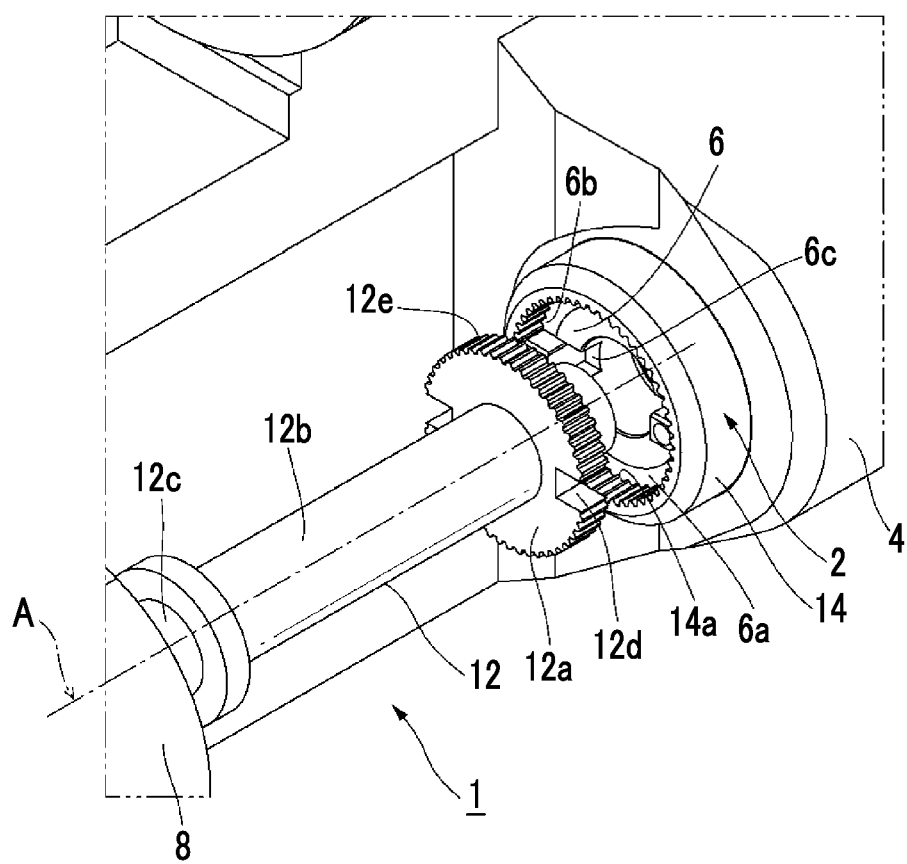
FIG. 4 is a perspective view showing a state where the large cutter is removed and a large cutter arbor is removed from a spindle in the main spindle mechanism of the machine tool shown in FIG. 2.

Hereinafter, with respect to the accompanying drawings, a main spindle mechanism of a machine tool according to an embodiment of the present invention will be described. In the present embodiment, the machine tool is a bobbing machine. Moreover, the present invention may be also applied to a main spindle mechanism such as a boring machine.

As shown in FIGS. 1 to 5, a reference numeral 1 shows the hobbing machine (machine tool) which cuts a workpiece, and the hobbing machine 1 includes a main spindle mechanism 2 which transmits torque by which a cutter is rotated. The main spindle mechanism 2 of the hobbing machine 1 includes a hob head 4, a hob spindle 6 which is disposed in the hob head 4, a hob support 8 which is disposed so as to face the hob spindle 6, and a large cutter arbor 12 and a small cutter arbor 18 which are connected between the hob spindle 6 and the hob support 8.

The hob head 4 is provided so as to rotatably support the hob spindle 6 which is disposed inside the hob head 4.

The hob spindle 6 forms a rotary shaft having a rotational axis A, is connected to a drive power source (not shown), and transmits torque (rotating force) from the drive power source to a cutter. Outer teeth 6b are formed on an outer peripheral surface of a tip portion 6a on a side of the hob spindle 6 which is connected to the cutter. In addition, key groove portions 6c are formed on two locations of the end surface of the tip portion 6a of the hob spindle 6. End surface drive keys 20 described below are fitted to the key groove portions 6c.

The hob support 8 rotatably supports the large cutter arbor 12 or the small cutter arbor 18 between the hob support 8 and the hob spindle 6.

In addition, the main spindle mechanism 2 of the hobbing machine 1 includes a gear-coupling-shaped sleeve 14 which is provided on the outer peripheral side of the tip portion 6a of the hob spindle 6.

Next, with reference to FIGS. 2 to 5, a case in which a large cutter (a hob having a relatively large blade edge) 10 is attached to the main spindle mechanism 2 of the hobbing machine 1 will be described.

The main spindle mechanism 2 of the hobbing machine 1 includes a large cutter arbor 12 to which the large cutter 10 is attached, and the large cutter arbor 12 includes a disk-shaped base 12a which is connected to the hob spindle 6, a shaft portion 12b for attaching the large cutter 10, and a tip portion 12c which is rotatably supported by the hob support 8.

Two groove portions 12d are formed on a base 12a of the large cutter arbor 12 so as to be recessed in a rectangular shape inward from the outer peripheral surface of the base 12a. Since two groove portions 12d have rectangular sides which are larger than the sides of the end surface drive keys 20 described below, in a state where the end surface drive keys 20 are inserted into the two groove portions 12, torque from the end surface drive keys 20 is not transmitted to the groove portions 12d.

Outer teeth 12e are formed on the outer peripheral surface of the base 12a of the large cutter arbor 12. An outer diameter D1 of the outer teeth 12e of the large cutter arbor 12 is the same as an outer diameter D2 of the outer teeth 6b which is formed on the tip portion 6a of the above-described hob spindle 6.

Inner teeth 14a are formed on the inner peripheral surface of the above-described gear-coupling-shaped sleeve 14. The gear-coupling-shaped sleeve 14 covers both the outer teeth 6b which are formed on the tip portion of the hob spindle 6 and the outer teeth 12e which are formed on outer peripheral surface of the base 12a of the large cutter arbor 12, and is provided such that the inner teeth 14a mesh with both the outer teeth 6b formed on the tip portion of the hob spindle 6 and the outer teeth 12e of the large cutter arbor 12.

Accordingly, when the hob spindle 6 rotates, the torque from the hob spindle 6 is transmitted from the outer teeth 6b of the hob spindle 6 to the outer teeth 12e of the large cutter arbor 12, that is, the large cutter arbor 12 via the inner teeth 14a of the gear-coupling-shaped sleeve 14.

The numbers and shapes of the outer teeth 6b of the hob spindle 6, the inner teeth 14a of the gear-coupling-shaped sleeve 14, and the outer teeth 12e of the large cutter arbor 12 are set so as to transmit a required large torque from the hob spindle 6.

Here, the large cutter 10 is a large hob having a rotating cutter in which relatively large cutting blades are disposed, is attached to the shaft portion 12b of the large cutter arbor 12, and rotates along with the large cutter arbor 12. In the main spindle mechanism 2 of the present embodiment, the large cutter 10 is disposed along the outer periphery of the shaft portion 12b from the vicinity of the base 12a to the vicinity of the tip portion 12c, and a spacer 121 (refer to FIG. 10) which is disposed between the base of the large cutter arbor and the large cutter in the device of the related art is not provided. When the large cutter 10 cuts a workpiece or the like, large torque (several thousands N·m) of the hob spindle 6 is transmitted to the large cutter 10 via the gear-coupling-shaped sleeve 14 and the large cutter arbor 12.

Since the spacer 121 which is required in the related art is not provided in the shaft portion 12b of the large cutter arbor 12, a length L1 in an axial direction of the large cutter 10 can be effectively used for the entire length of the shaft portion 12b of the large cutter arbor 12. In addition, it is possible to prevent a size of the machine from increasing while generating elements by which stiffness of the large cutter arbor 12 is decreased.

In addition, the gear-coupling-shaped sleeve 14 can be removed from the hob spindle 6, and in a state where the gear-coupling-shaped sleeve 14 is removed, the large cutter arbor 12 can be used to be exchanged with the small cutter arbor 18.

In the main spindle mechanism 2 of the hobbing machine 1 according to the present embodiment, since the gear-coupling-shaped sleeve 14 or the like is used in order to transmit a torque from the hob spindle 6 to the large cutter arbor 12, a contact area for transmitting torque increases. Accordingly, unlike the related art, it is possible to decrease the diameter of the hob spindle 6. Specifically, the diameter D3 of the hob spindle according to the present embodiment can be decreased by 30% compared to a diameter D5 of a hob spindle 106 in a main spindle mechanism 102 of the related art, in which torque is transmitted by end surface drive keys 120, shown in FIG. 10.

Here, since the gear-coupling-shaped sleeve 14 is configured in a cylindrical shape which covers both the outer periphery of the base 12a of the large cutter arbor 12 and the outer periphery of the tip portion 6a of the hob spindle 6, the diameter D3 of the gear-coupling-shaped sleeve 14 is slightly larger than the diameter D2 of the hob spindle 6.

Next, with reference to FIGS. 6 to 9, a case in which a small cutter 16 is attached to the main spindle mechanism 2 of the hobbing machine 1 will be described.

First, when the small cutter 16 is attached to the main spindle mechanism 2 of the hobbing machine 1, the gear-coupling-shaped sleeve 14 is removed, and subsequently, the large cutter 10 and the large cutter arbor 12 are removed, and the small cutter arbor 18 to which the small cutter 16 is attached is attached to main spindle mechanism 2.

The small cutter arbor 18 includes a base 18a which is connected to the tip portion 6a of the hob spindle 6, a shaft portion 18b in the small cutter 16 is attached to the outer periphery thereof, and a tip portion 18c which is rotatably supported by the hob support 8. In addition, two groove portions 18d which are recessed in a rectangular shape inward from the outer peripheral surface are formed on the base 18a of the small cutter arbor 18, and the end surface drive keys 20 are inserted into the two groove portions 18d and fitted to the key groove portions 6c of the hob spindle 6. The torque from the hob spindle 6 is transmitted to the small cutter arbor 18 by the end surface drive keys 20.

A diameter D4 of the small cutter arbor base 18a is smaller than the diameter D1 of the large cutter arbor base 12a, and is smaller than the diameter D2 of the tip portion 6a of the hob spindle 6.

The diameter D4 is a diameter which is required for transmitting torque to the small cutter arbor 18 via the end surface drive keys 20.

The small cutter 16 is a small hob of a rotating cutter on which relatively small cutting blades are formed, and is rotated along with the small cutter arbor 18. When the small cutter 16 performs gear cutting of a gear to be machined, torque which is smaller than the torque required when the large cutter 10 is used is transmitted to the small cutter 16 via the small cutter arbor 18.

In the main spindle mechanism 2 of the hobbing machine 1 of the present embodiment, the small cutter 16 is disposed between a small cutter spindle side spacer 22 adjacent to the small cutter arbor base 18a and a small cutter support side spacer 23 adjacent to the small cutter arbor tip portion 18c along the outer periphery of the small cutter arbor shaft portion 18b.

As described below, since the small cutter spindle side spacer 22 is formed so as to have a length L2 which is shorter than a length L6 of a small cutter spindle side spacer 122 of the related art, it is possible to dispose the small cutter 16 to the vicinity of the small cutter arbor base 18a.

The small cutter support side spacer 23 is set to a length L8 in which the workpiece W cut by the small cutter 16 does not collide with the hob support 8.

Since the small cutter spindle side spacer 22 of the small cutter arbor 18 has the length L2 which is shorter than the length L6 of the small cutter spindle side spacer 122 of the related art, the small cutter 16 has a length L3 which is longer than a length L7 of the small cutter when the spacer of the related art described below is formed so as to be longer.

The length of the small cutter arbor shaft portion 18b of the small cutter arbor 18 is formed in a length which suppresses a total of the length L3 in the rotational axis direction of the small cutter 16, the length L2 of the small cutter spindle side spacer 22, and the length L8 of the small cutter support side spacer 23.

Moreover, in the main spindle mechanism 2 of the hobbing machine 1 of the present embodiment, it is possible to use a small cutter having the length L3 which is longer than the length L7 in the rotational axis direction of the small cutter 16 in the small cutter spindle of the related art.

In addition, in the present embodiment, in the state where the small cutter 16 is attached, since the small cutter arbor 18 is connected to the hob spindle 6 by the end surface drive keys 20 in a state where the gear-coupling-shaped sleeve 14 is omitted, when the small cutter 16 is used, the gear-coupling-shaped sleeve 14 is not present, and the small cutter arbor base 18a is formed so as to have the diameter D4 which is smaller than the diameter D2 of the annular tip portion 6a of the hob spindle 6.

In this way, when the small cutter 16 is used, after the hob spindle 6 is set so as to have the diameter D2, and in the state where the gear-coupling-shaped sleeve 14 is omitted, it is possible to transmit relatively small torque to the small cutter arbor base 18a having the diameter D4 by the end surface drive keys 20.

Next, with reference to FIGS. 2 to 5, an operation (effect) of the main spindle mechanism in the state where the large cutter according to the embodiment of the present invention is attached will be described.

When a user of the main spindle mechanism 2 according to the embodiment of the present invention cuts the workpiece W using the large cutter 10, relatively a large torque (hereinafter, abbreviated to a "large torque") by which the large cutter 10 is rotated is transmitted by the main spindle mechanism 2.

The hob spindle 6 is rotated about the rotational axis A by a large torque generated by the drive power source of the hobbing machine 1. Since the outer teeth 6b of the hob spindle 6 and the inner teeth 14a of the gear-coupling-shaped sleeve 14 are rotated while meshing with each other by a sufficient tooth number, the large torque by which the hob spindle 6 is rotated is transmitted to the gear-coupling-shaped sleeve 14. The gear-coupling-shaped sleeve 14 is rotated about the rotational axis A, and since the inner teeth 14a of the gear-coupling-shaped sleeve 14 and the outer teeth 12e of the large cutter arbor 12 are rotated while meshing with each other by a sufficient tooth number, the torque by which the gear-coupling-shaped sleeve 14 is rotated is transmitted to the large cutter arbor 12. The torque transmitted to the large cutter arbor 12 rotates the large cutter arbor 12 about the rotational axis A, and rotates the large cutter attached to the large cutter arbor 12 about the rotational axis A.

Figure 5:
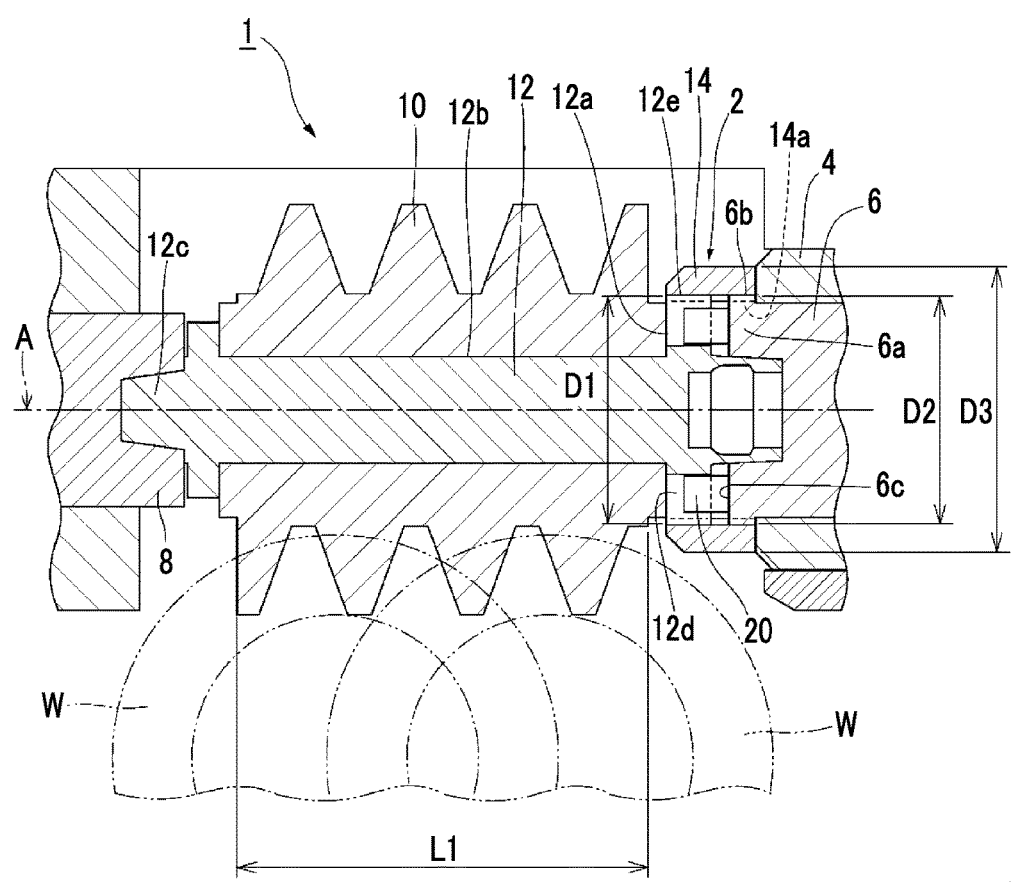
FIG. 5 is a sectional view taken along line V-V of FIG. 2.
Figure 6:
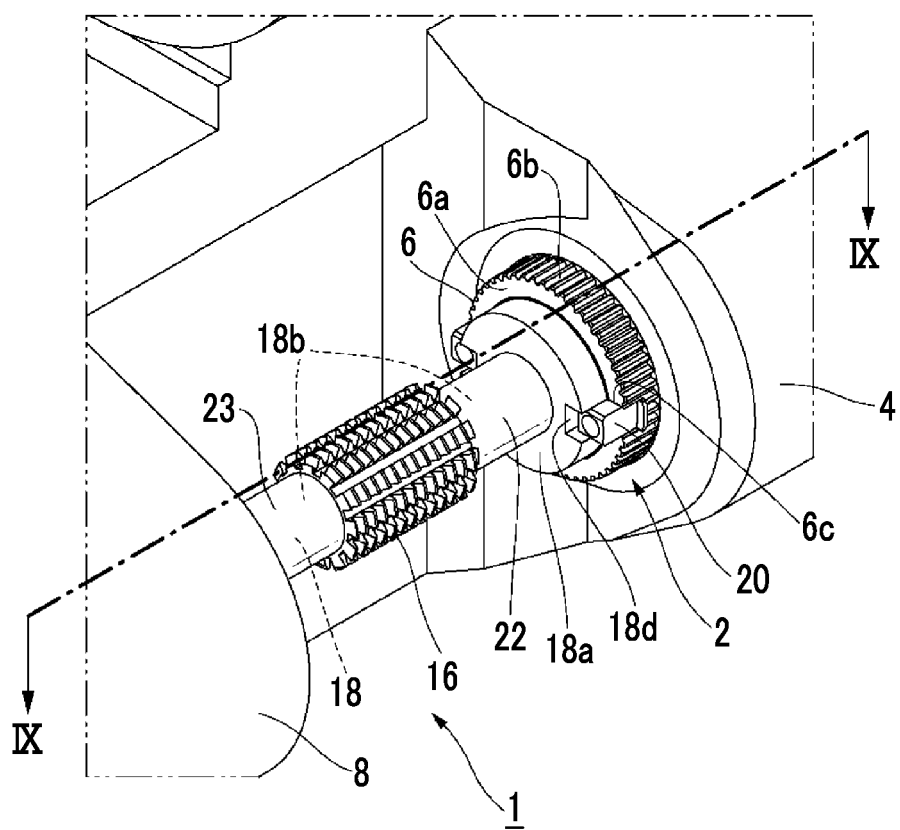
FIG. 6 is a perspective view showing the main spindle mechanism of the machine tool in a state where a small cutter according to the embodiment of the present invention is attached.
Figure 7:
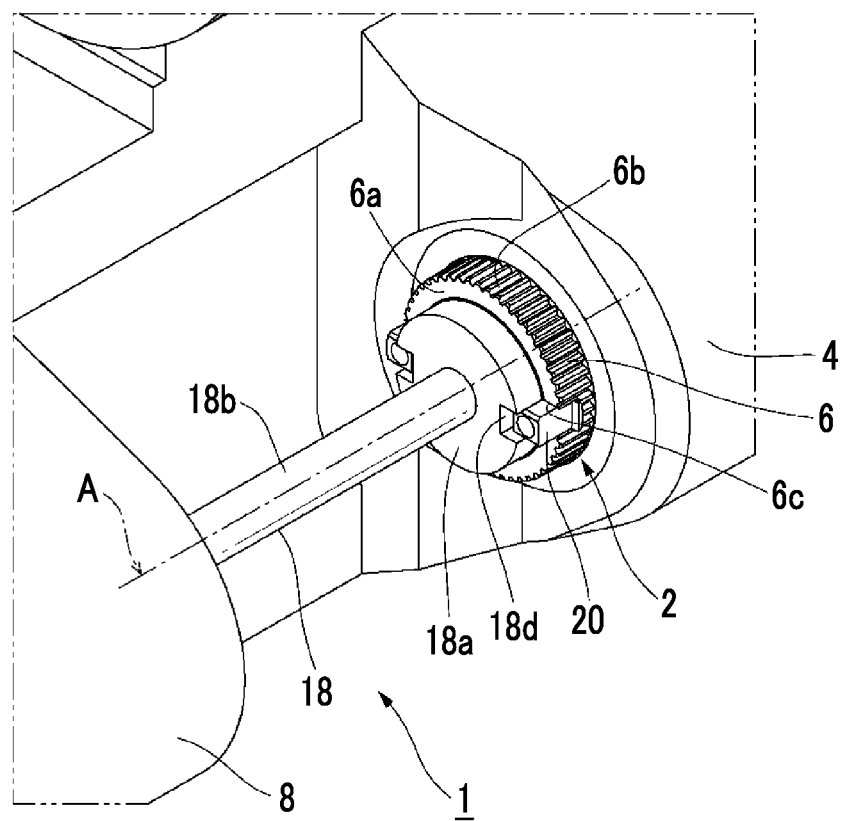
FIG. 7 is a perspective view showing a state where the small cutter is removed in the main spindle mechanism of the machine tool shown in FIG. 6.
Figure 8:
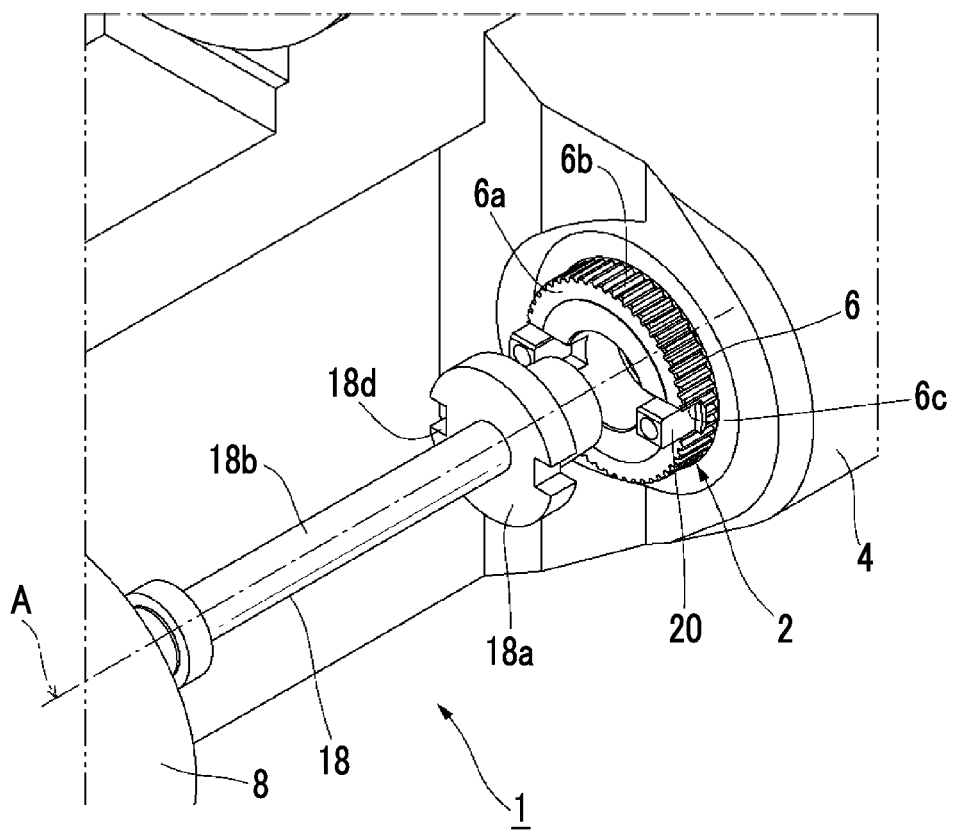
FIG. 8 is a perspective view showing a state where the small cutter is removed and a small cutter arbor is removed from the spindle in the main spindle mechanism of the machine tool shown in FIG. 6.

When the large cutter 10 cuts the workpiece W, as shown in FIG. 5, in the state where the large cutter spindle side spacer 121 required in the related art is omitted, it is possible to cut the workpiece W, which is an object to be machined, by the large cutter 10 which extends to the vicinity of the gear-coupling-shaped sleeve 14. FIG. 5 shows the state where the workpiece W is cut while moving along the large cutter 10 according to reference numerals of the workpiece W.

In the main spindle mechanism 2 according to the embodiment of the present invention, since the hob spindle 6 is formed so as to have the small diameter D2, even when the workpiece W cut by the large cutter 10 is cut by the blade in the vicinity of the gear-coupling-shaped sleeve 14, the workpiece W does not easily collide with or come into contact with the gear-coupling-shaped sleeve 14. In addition, since the large cutter 10 can be formed so as to be longer, a range in which the large cutter 10 can cut the workpiece W in a state of being deviated extends, the large cutter 10 can cut the workpiece W effectively using the blade of the base side close to the gear-coupling-shaped sleeve 14, the entire large cutter 10 can be effectively used so as to cut the workpiece, and it is possible to extend a tool life of the large cutter 10.

Figure 10:
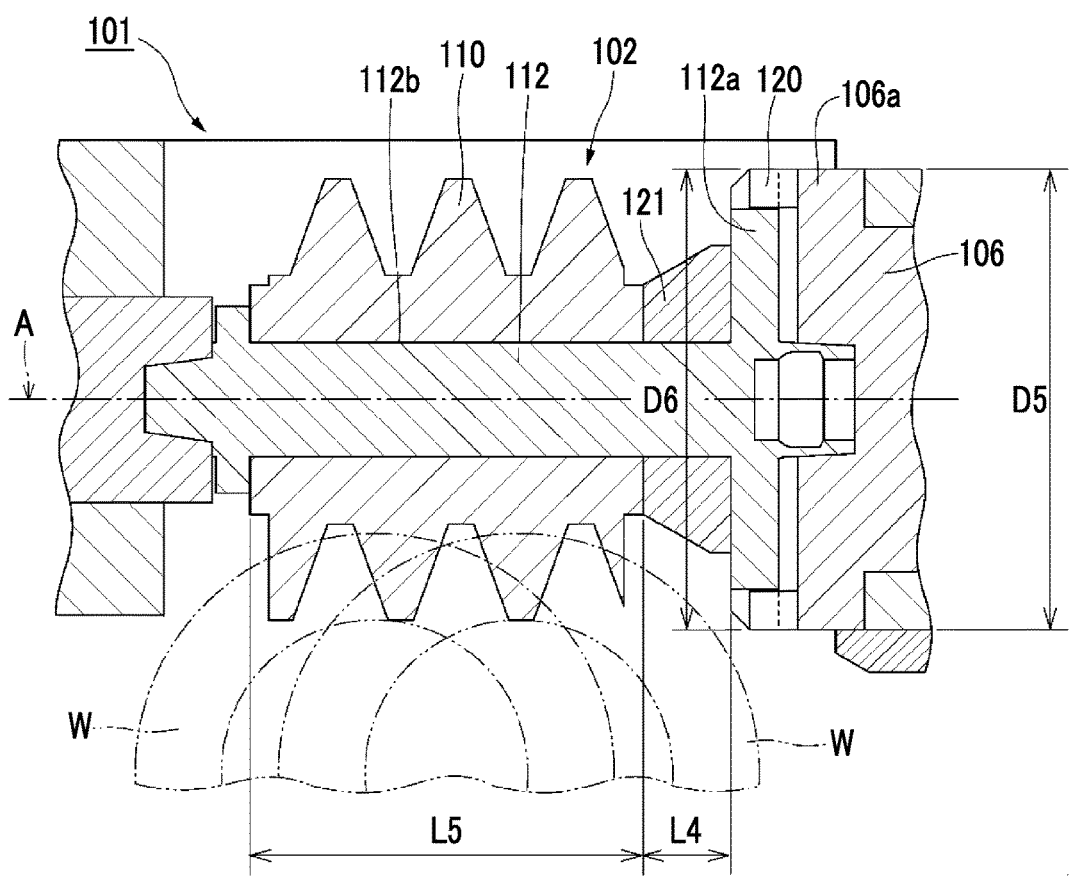
FIG. 10 is a sectional view showing a main spindle mechanism of a machine tool in a state where a large cutter of the related art is attached.

Meanwhile, as shown in FIG. 10, a structure of a main spindle mechanism, to which a large cutter of a machine tool of the related art compared to the main spindle mechanism of the embodiment of the present invention is attached, will be described.

In the main spindle mechanism 102 of a hobbing machine 101 of the related art, a tip portion 106*a* of the hob spindle 106 and a base 112*a* of a large cutter arbor 112 are fitted and connected to each other by two end surface drive keys 120. When a user of the main spindle mechanism 102 of the hobbing machine 101 of the related art cuts the workpiece W using a large cutter 110, in order to transmit a large torque by which the hob spindle 106 is rotated by the end surface drive keys 120, it is necessary to form the hob spindle 106 such that the diameter of the hob spindle has the increased diameter D5, and it is necessary to from the large cutter arbor 12*a* such that the diameter of the large cutter arbor base has the increased diameter D6.

Accordingly, when the large cutter 110 rotating about the rotational axis A cuts the workpiece W in a region close to the hob spindle 106, the workpiece W easily collides with or comes into contact with the hob spindle 106 or the large cutter arbor base 112*a*.

In addition, in the main spindle mechanism 102 of the hobbing machine 101 of the related art, since the diameter D5 of the hob spindle 106 and the diameter D6 of the large cutter arbor base 112*a* are formed to be increased, in order to allow the workpiece W not easily to collide with or come into contact with the hob spindle 106 or the large cutter arbor 112, the large cutter spindle side spacer 121 is provided, which forms a space having a predetermined distance between the large cutter 110 and the base 112*a*.

Accordingly, the large cutter 110 is separated from the base 112*a* by a length L4 of the large cutter spindle side spacer 121 due to the large cutter spindle side spacer 121, and the large cutter 110 is formed so as to have the remaining short length L5. In this way, when the large cutter spindle side spacer 121 is provided, the large cutter 110 is faulted so as to have the shorter length L5.

Accordingly, in the large cutter 110, the base side blades close to the base 112*a* cannot be effectively used so as to cut the workpiece, and the large cutter 110 is collectively used in the relatively short length L5. Therefore, the tool life of the large cutter 110 is shortened.

In order to use the large cutter having the length L1, it is necessary to extend the length (L5+L4) of the shaft portion 112*b* of the large cutter arbor to the length (L1+L4). In addition, since the length of the large cutter arbor 112 increases, the size of the hobbing machine 101 increases.

Next, with reference to FIGS. 6 to 9, an operation (effect) of the main spindle mechanism in the state where the small cutter according to the embodiment of the present invention is attached will be described.

When a user of the main spindle mechanism 2 according to the embodiment of the present invention cuts the workpiece W using the small cutter 16, relatively small torque (hereinafter, abbreviated to "small torque") by which the small cutter 16 is rotated is transmitted by the main spindle mechanism 2.

The hob spindle 6 is rotated about the rotational axis A by small torque generated by the drive power source of the hobbing machine 1. The small torque by which the hob spindle 6 is rotated is transmitted to the base 18*a* by the end surface drive keys 20 which are fitted to the hob spindle key groove portions 6*c* and the groove portions 18*d*, and are positioned at two locations. The torque transmitted to the base 18*a* rotates the small cutter arbor about the rotational axis A, and rotates the small cutter 16, which is attached to the small cutter arbor 18, about the rotational axis A.

Figure 9:
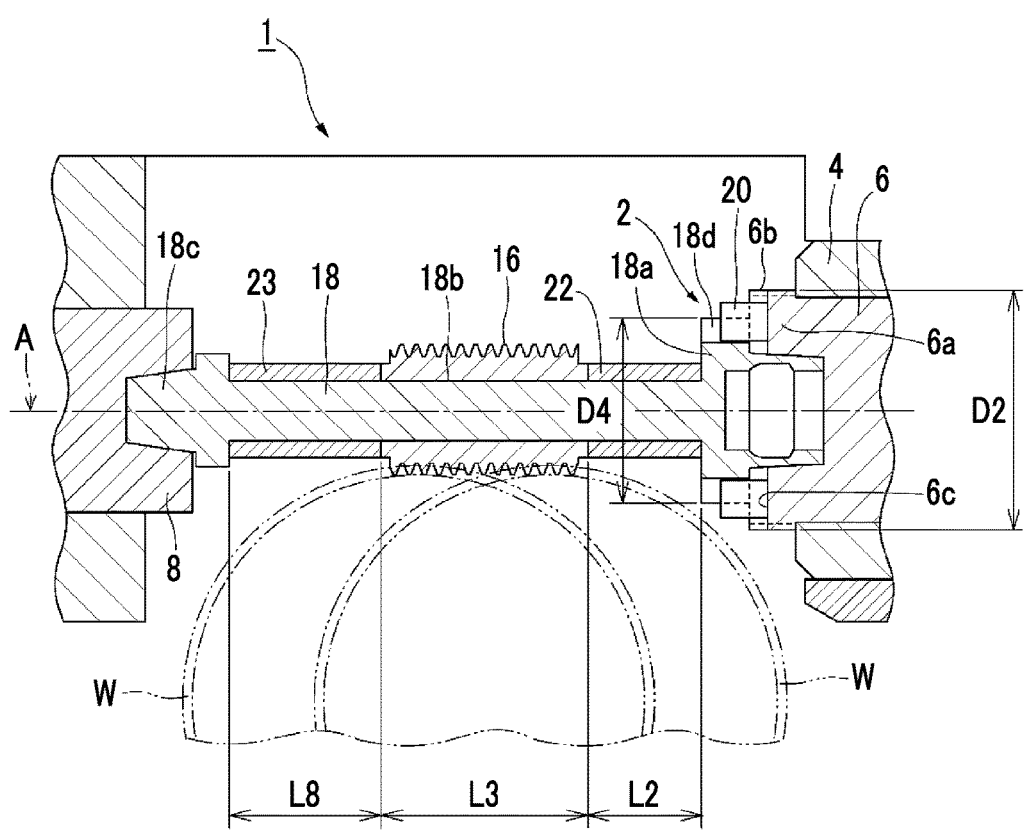
FIG. 9 is a sectional view taken along line IX-IX of FIG. 6.

When the small cutter 16 cuts the workpiece W, as shown in FIG. 9, since the length L2 of the small cutter spindle side spacer 22 is formed so as to be short, the workpiece W which is the object to be machined is cut to the vicinity of the hob spindle 6 by the small cutter 16 which extends to the vicinity of the hob spindle 6. FIG. 9 shows the state where the workpiece W is cut while moving along the small cutter 16 according to reference numerals of the workpiece W.

When the workpiece W is cut using the small cutter 16, the position at which the workpiece W is cut using the small cutter 16 is positioned so as to be closer to the rotational axis A than the position at which the workpiece W is cut using the large cutter 10. Accordingly, when the workpiece W is cut using the small cutter 16, the workpiece W is cut to be inserted into the position in the vicinity of the rotational axis A in which the workpiece W more easily comes into contact with the hob spindle 6, the gear-coupling-shaped sleeve 14, or the like.

Here, since the diameter D2 of the hob spindle 6 is set so as to be small, and the hob spindle 6 and the small cutter arbor 18 are connected to each other in the state where the gear-coupling-shaped sleeve 14 is removed, by removing the gear-coupling-shaped sleeve 14, the workpiece W does not collide with or does not come into contact with the gear-coupling-shaped sleeve 14, and even when the small cutter 16 is attached to the vicinity of the base 18*a*, the workpiece W cut by the small cutter 16 does not easily collide with or come into contact with the small cutter arbor base 18*a*.

In addition, since the small cutter 16 is formed so as to be relatively long, a range in which the small cutter 16 can cut the workpiece W in a state of being deviated extends, the small cutter 16 can cut the workpiece W effectively using the blade in the vicinity of the hob spindle 6 of the small cutter 16, the entire small cutter 16 can be effectively used so as to cut the workpiece, and it is possible to extend a tool life of the small cutter 16.

Figure 11:
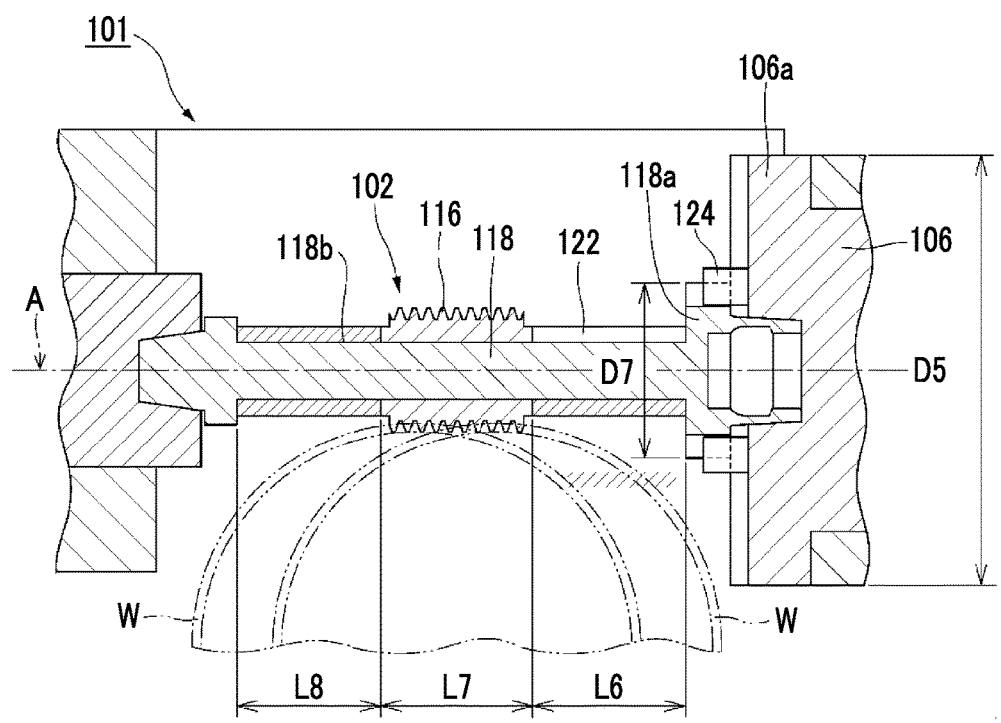
FIG. 11 is a sectional view showing the main spindle mechanism of the machine tool in a state where a small cutter of the related art is attached.

Meanwhile, as shown in FIG. 11, a structure of a main spindle mechanism, to which a small cutter of a machine tool of the related art compared to the main spindle mechanism of the embodiment of the present invention is attached, will be described.

In the main spindle mechanism 102 of the hobbing machine 101 of the related art, the tip portion 106a of the hob spindle 106 and a base 118a are fitted and connected to each other by two end surface drive keys 124. When a user of the main spindle mechanism 102 of the hobbing machine 101 of the related art cuts the workpiece W using a small cutter 116, the large cutter arbor 112 is exchanged with the small cutter arbor 118. However, the diameter of the hob spindle 106 is set so as to be the diameter D5 which is relatively larger than the diameter when the large cutter arbor base 112a and the end surface drive keys 120 are connected to each other.

Here, even when the attached small cutter arbor base 118a is formed so as to have the small diameter D7, since the diameter D5 of the hob spindle 106 increases and the hob spindle 106 is formed, when the small cutter 116 cuts the workpiece W in the region close to the hob spindle 106, the workpiece W which is the objet to be machined easily collides with or comes into contact with the hob spindle 106.

In addition, since the diameter D5 of the hob spindle 106 increases and the hob spindle 106 is formed, in order to allow the workpiece W not easily to collide with or come into contact with the hob spindle 106, the small cutter spindle side spacer 122 is provided, which has a relatively long length L6 by which the small cutter 116 and the base 118a are separated from each other by a predetermined distance.

Accordingly, the small cutter spindle side spacer 122 which is formed so as to have the relatively long length L6 is provided, the small cutter 116 is disposed so as to be separated from the small cutter arbor base 118a by the relatively long length L6 of the small cutter spindle side spacer 122, and the small cutter 116 is formed so as to have the short length L7.

Accordingly, it is not possible to extend the small cutter 116 to the vicinity of the base 118a, it is not possible to effectively use the region in the vicinity of the base 118a to cut the workpiece, and the small cutter 116 is collectively used in the relatively short length L7. Accordingly, the tool life of the small cutter 116 is shortened.

When the small cutter having the length L3 is used, it is necessary to extend the length (L6+L7+L8) of the small cutter arbor shaft portion 118b so as to be the length (L6+L3+L8), and support stiffness of the small cutter decreases. In addition, since the length of the small cutter arbor 118 increases, the size of the bobbing machine 101 increases.

According to the main spindle mechanism 2 of the embodiment of the present invention, since the gear-coupling-shaped sleeve 14 is provided so as to cover the tip portion 6a of the hob spindle 6 and the base 12a of the large cutter arbor 12, and the inner teeth 14a which mesh with both the outer teeth 6b of the hob spindle 6 and the outer teeth 12e of the large cutter arbor 12 are formed, the torque of the hob spindle 6 is transmitted to the shaft portion 12b of the large cutter arbor 12, to which the large cutter 10 is attached, via the outer teeth 6b of the hob spindle 6, the inner teeth 14a of the gear-coupling-shaped sleeve 14, and the outer teeth 12e of the large cutter arbor 12. In this way, in the present invention, since the torque of the hob spindle 6 is transmitted by meshing of the teeth, relatively large torque can be transmitted, and unlike the related art, when the large cutter 10 is used, it is possible to set the diameter D2 of the hob spindle 6 so as to be relatively small. Moreover, since it is possible to decrease the diameter D2 of the hob spindle 6, it is possible to prevent contact and collision between the workpiece W and the hob spindle 6.

In addition, since the workpiece W does not easily collide with the hob spindle 6 and the gear-coupling-shaped sleeve 14, it is possible to attach the large cutter 10 to the vicinity of the base 12a, and it is possible to decrease length of the large cutter arbor 12 to which the large cutter 10 is attached. Accordingly, it is possible to prevent stiffness of the large cutter arbor 12 supporting the large cutter 10 from deceasing, and it is possible to suppress an increase in the size of the machine tool having the main spindle mechanism 2.

Moreover, according to the main spindle mechanism 2 of the embodiment of the present invention, when the workpiece W is cut using the small cutter 16, in the state where the gear-coupling-shaped sleeve 14 is removed, the small cutter arbor 18 is connected to the hob spindle 6 by the end surface drive key 20. Accordingly, the workpiece W does not collide with the gear-coupling-shaped sleeve portion 14, and the outer diameter of the base 18a of the small cutter arbor 18 is smaller than the base 12a of the large cutter arbor 12. Therefore, it is possible to prevent the workpiece W from colliding with the base 18a of the small cutter arbor 18.

In addition, since the workpiece W does not easily collide with the small cutter arbor 18, it is possible to attach the small cutter 16 to the relatively vicinity of the small cutter arbor base 18a, and it is possible to decrease the length of the small cutter arbor 18 to which the small cutter 16 is attached. Accordingly, it is possible to prevent stiffness of the small cutter arbor 18 supporting the small cutter 16 from deceasing, and it is possible to suppress an increase in the size of the machine tool having the main spindle mechanism 2.

REFERENCE SIGNS LIST

1: hobbing machine
2: main spindle mechanism
6: hob spindle
6b: outer teeth
10: large cutter
12: large cutter arbor
12a: large cutter arbor base
12e: outer teeth
14: gear-coupling-shaped sleeve
14a: inner teeth
16: small cutter
18: small cutter arbor
18a: small cutter arbor base
20: end surface drive key
22: small cutter spindle side spacer
101: hobbing machine
102: main spindle
106: hob spindle
110: large cutter
112: large cutter arbor
112a: large cutter arbor base
116: small cutter
118: small cutter arbor
118a: small cutter arbor base
120: end surface drive key

121: large cutter spindle side spacer
122: small cutter spindle side spacer
A: rotational axis
W: workpiece

The invention claimed is:

1. A main spindle mechanism which is provided on a machine tool which cuts a workpiece by means of a cutter, comprising:
   a spindle which transmits torque from a drive power source of the machine tool and in which outer gear teeth are formed on an outer periphery of a tip of the spindle;
   a large cutter arbor which includes a shaft portion for attaching a large cutter and a base in which outer gear teeth having the same diameters as the outer gear teeth of the spindle are formed; and
   a gear-coupling-shaped sleeve which is provided so as to cover the tip of the spindle and the base of the large cutter arbor and in which inner gear teeth which mesh with both the outer gear teeth of the spindle and the outer gear teeth of the large cutter arbor are formed.

2. The main spindle mechanism according to claim 1, further comprising:
   a small cutter arbor which includes a shaft portion for attaching a small cutter and a base which has a smaller outer diameter than that of the base of the large cutter arbor; and
   an end surface drive key for connecting the base of the small cutter arbor and an end surface of the tip of the spindle,
   wherein when the small cutter is used, the large cutter arbor is removed in a state where the gear-coupling-shaped sleeve is removed, and the small cutter arbor is connected to the spindle by the end surface drive key.

3. The main spindle mechanism according to claim 1, wherein the machine tool is a hobbing machine.

4. A machine tool comprising the main spindle mechanism according to claim 1.

5. The main spindle mechanism according to claim 2, wherein the machine tool is a hobbing machine.

6. A machine tool comprising the main spindle mechanism according to claim 2.

\* \* \* \* \*